United States Patent
Baychar

(10) Patent No.: US 7,147,911 B2
(45) Date of Patent: *Dec. 12, 2006

(54) WATERPROOF/BREATHABLE TECHNICAL APPAREL

(75) Inventor: Baychar, Carrhassett, ME (US)

(73) Assignee: SolidaWater Holdings, Eastport, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/777,159

(22) Filed: Feb. 13, 2004

(65) Prior Publication Data

US 2005/0090171 A1    Apr. 28, 2005

Related U.S. Application Data

(63) Continuation of application No. 08/910,115, filed on Aug. 13, 1997, which is a continuation-in-part of application No. 08/832,800, filed on Apr. 4, 1997, now abandoned, which is a continuation-in-part of application No. 08/747,340, filed on Nov. 12, 1996, now Pat. No. 5,738,937.

(51) Int. Cl.
*B32B 5/18* (2006.01)
*B32B 3/16* (2006.01)
*B32B 5/24* (2006.01)
*B32B 5/26* (2006.01)
*A43B 13/28* (2006.01)

(52) U.S. Cl. .............. 428/304.4; 428/315.9; 428/913; 442/55; 442/221; 442/315; 442/373; 442/370; 442/224; 442/225; 442/86; 36/24.5; 36/305; 36/44; 36/55; 36/115; 36/118

(58) Field of Classification Search ........... 442/221, 442/224, 315, 370, 86; 428/304.4
See application file for complete search history.

(56) References Cited

U.S. PATENT DOCUMENTS

| | | | |
|---|---|---|---|
| 3,020,169 A | | 2/1962 | Phillips, Jr. et al. |
| 3,570,150 A | | 3/1971 | Field |
| 3,607,593 A | | 9/1971 | Semenzato |
| 3,616,170 A | | 10/1971 | Closson Jr. |
| 3,779,855 A | | 12/1973 | Fonzi et al. |
| 3,839,138 A | | 10/1974 | Kyle et al. |
| 3,961,124 A | | 6/1976 | Matton |
| 4,015,347 A | | 4/1977 | Morishita et al. |
| 4,050,491 A | * | 9/1977 | Hargrove ............. 297/188.2 |
| 4,216,177 A | | 8/1980 | Otto |
| 4,245,410 A | | 1/1981 | Molitor |
| 4,287,629 A | | 9/1981 | Stalteri |

(Continued)

FOREIGN PATENT DOCUMENTS

EP    0899090    3/1999

OTHER PUBLICATIONS

Rodriguez, Ferdinand, Principles of Polymer Systems, 1982, Hemisphere Publishing Corp., 2$^{nd}$ Ed., p. 362.

(Continued)

*Primary Examiner*—Terrel Morris
*Assistant Examiner*—Matthew Matzek
(74) *Attorney, Agent, or Firm*—Mattingly, Stanger, Malur & Brundidge, P.C.

(57) ABSTRACT

The apparel is constructed from various combinations of layers of materials with moisture transfer properties. A first liner of moisture transfer fabrics abuts a second layer of structural material such as a foam. The second layer can abut a breathable membrane and/or an insulating material. Finally, carefully selected outer fabrics complete the combination to provide apparel with improved performance characteristics. The outer fabrics are treated in various ways to enhance performance.

61 Claims, 6 Drawing Sheets

U.S. PATENT DOCUMENTS

| | | | |
|---|---|---|---|
| 4,338,366 A | 7/1982 | Evans et al. | |
| 4,338,371 A | 7/1982 | Dawn et al. | |
| 4,454,191 A | 6/1984 | von Blucher et al. | |
| 4,482,593 A | 11/1984 | Sagel et al. | |
| 4,524,529 A | 6/1985 | Schaefer | |
| 4,529,641 A | 7/1985 | Holtrop | |
| 4,599,810 A | 7/1986 | Sacre | |
| 4,621,013 A | 11/1986 | Holtrop et al. | |
| 4,656,760 A | 4/1987 | Tonkel et al. | |
| 4,662,006 A | 5/1987 | Ross, Jr. | |
| 4,666,765 A | 5/1987 | Caldwell | |
| 4,674,204 A | 6/1987 | Sullivan et al. | |
| 4,729,179 A | 3/1988 | Quist, Jr. | |
| 4,756,958 A | 7/1988 | Bryant et al. | |
| 4,805,319 A | 2/1989 | Tonkel | |
| 4,816,328 A | 3/1989 | Saville et al. | |
| 4,823,407 A | 4/1989 | Phillips, Jr. et al. | |
| 4,845,862 A | 7/1989 | Phillips, Jr. et al. | |
| 4,894,932 A | 1/1990 | Harada et al. | |
| 4,909,523 A | 3/1990 | Olson | |
| 4,910,886 A | 3/1990 | Sullivan et al. | |
| 5,004,643 A | 4/1991 | Caldwell | |
| 5,010,596 A | 4/1991 | Brown et al. | |
| 5,021,280 A | 6/1991 | Farnworth et al. | |
| 5,035,943 A | 7/1991 | Kinlaw et al. | |
| 5,043,209 A | 8/1991 | Boisse et al. | |
| 5,073,298 A | 12/1991 | Gentle et al. | |
| 5,075,343 A | 12/1991 | Blount | |
| 5,092,614 A | 3/1992 | Malewicz | |
| 5,098,778 A | 3/1992 | Minnick | |
| 5,126,182 A | 6/1992 | Lumb et al. | |
| 5,134,017 A | 7/1992 | Baldwin et al. | |
| 5,154,682 A | 10/1992 | Kellerman | |
| 5,169,712 A | 12/1992 | Tapp | |
| 5,171,033 A | 12/1992 | Olson et al. | |
| 5,209,965 A | 5/1993 | Caldwell | |
| 5,216,825 A | 6/1993 | Brum | |
| 5,224,356 A | 7/1993 | Colvin et al. | |
| 5,253,434 A | 10/1993 | Curley, Jr. et al. | |
| 5,269,862 A | 12/1993 | Nakajima et al. | |
| 5,277,954 A | 1/1994 | Carpenter et al. | |
| 5,290,904 A | 3/1994 | Colvin et al. | |
| 5,330,208 A | 7/1994 | Charron et al. | |
| 5,340,132 A | 8/1994 | Malewicz | |
| 5,342,070 A | 8/1994 | Miller et al. | |
| 5,364,678 A | 11/1994 | Lumb et al. | |
| 5,365,677 A | 11/1994 | Dalhgren | |
| 5,366,801 A | 11/1994 | Bryant et al. | |
| 5,378,529 A | 1/1995 | Bourdeau | |
| 5,380,020 A | 1/1995 | Arney et al. | |
| 5,397,141 A | 3/1995 | Hoshizaki et al. | |
| 5,398,948 A | 3/1995 | Mathis | |
| 5,400,526 A | 3/1995 | Sessa | |
| 5,415,222 A | 5/1995 | Colvin et al. | |
| 5,418,051 A | 5/1995 | Caldwell | |
| 5,431,970 A * | 7/1995 | Broun et al. | 428/36.5 |
| 5,437,466 A | 8/1995 | Meibock et al. | |
| 5,439,733 A | 8/1995 | Paire | |
| 5,452,907 A | 9/1995 | Meibock et al. | |
| 5,456,393 A | 10/1995 | Mathis et al. | |
| 5,499,459 A | 3/1996 | Tomaro | |
| 5,499,460 A | 3/1996 | Bryant et al. | |
| 5,503,413 A | 4/1996 | Belogour | |
| 5,544,908 A | 8/1996 | Fezio | |
| 5,566,395 A | 10/1996 | Nebeker | |
| 5,575,090 A | 11/1996 | Condini | |
| 5,637,389 A * | 6/1997 | Colvin et al. | 428/308.4 |
| 5,677,048 A | 10/1997 | Pushaw | |
| 5,682,613 A | 11/1997 | Dinatale | |
| 5,727,336 A | 3/1998 | Ogden | |
| 5,738,937 A | 4/1998 | Baychar | |
| 5,763,335 A | 6/1998 | Hermann | |
| 5,775,006 A | 7/1998 | Breuner | |
| 5,785,909 A | 7/1998 | Chang et al. | |
| 5,787,502 A | 8/1998 | Middleton | |
| 5,876,792 A * | 3/1999 | Caldwell | 427/171 |
| 5,932,299 A | 8/1999 | Katoot | |
| 5,970,629 A | 10/1999 | Tucker et al. | |
| 6,004,662 A | 12/1999 | Buckley | |
| 6,048,810 A | 4/2000 | Baychar | |
| 6,065,227 A | 5/2000 | Chen | |
| 6,074,966 A | 6/2000 | Zlatkus | |
| 6,200,915 B1 | 3/2001 | Adams | |
| 6,237,251 B1 | 5/2001 | Litchfield et al. | |
| 6,474,001 B1 | 11/2002 | Chen | |
| 6,474,002 B1 | 11/2002 | Chen | |
| 6,479,009 B1 | 11/2002 | Zlatkus | |
| 6,602,811 B1 | 8/2003 | Rock et al. | |
| 6,604,302 B1 | 8/2003 | Polegato Moretti | |
| 6,660,667 B1 * | 12/2003 | Zuckerman et al. | 442/131 |
| 6,893,695 B1 | 5/2005 | Baychar | |
| 2001/0009830 A1 * | 7/2001 | Baychar | 442/118 |
| 2001/0016992 A1 | 8/2001 | Gross | |
| 2002/0012784 A1 | 1/2002 | Norton et al. | |

OTHER PUBLICATIONS

Olympia Sports Catalog, Olympia Performance Gloves, 1993, pp. 2-8.

MOTOPORT—1991 MOTOPORT U.S.A. Apparel and Accessory Catalog, 1991.

KAMIK Catalog, 1997.

LaCrosse Catalog, 1997.

Frisby Technologies Test Report—"Insulated Boot Lines Containing Microencapsulated Phase Change Materials", Dec. 12, 1995.

Frisby Technologies Test Report—"Cold Weather Boot Liners Containing COMFORTEMP Foam", Sep. 24, 1996.

"Analytical Modeling of A MicroPCM-Enhanced Diver Dry Suit", U.S. Naval Academy, Technical Report EW-20-96, Aug. 1996.

Soccer Technology Catalog, PUMA, 1992.

OUTLAST Style #1750 (Alpine 1), Product Specification, 1996.

OUTLAST Style #4330 (Alpine 2), Product Specification, 1996.

OUTLAST Alpine TRF3, Product Information Sheet, 1996.

Frisby Technology Documents, No. F001006-F001009, Jun. 1996.

* cited by examiner

WATERPROOF/BREATHABLE TECHNICAL APPAREL

This is a continuation application of U.S. Ser. No. 08/910,115, filed Aug. 13, 1997, which is a continuation-in-part application of U.S. Ser. No. 08/832,800, filed Apr. 4, 1997, now abandoned, which is a continuation-in-part application of U.S. Ser. No. 08/747,340, filed Nov. 12, 1996, now U.S. Pat. No. 5,738,937.

FIELD OF THE INVENTION

The present invention relates to apparel (garments) which is particularly suited to transfer moisture away from an individual. Particularly, the present invention relates to apparel constructed according to a moisture transfer system having a combination of layers that removes moisture away from an individual while also being comfortable and aesthetically pleasing in appearance.

BACKGROUND OF THE INVENTION

Various types of apparel are known in the prior art. However, none of these provide the advantages provided by the present invention. In particular, the types of apparel known in the art do not take advantage of the new advances in materials and fabrics that have been made in recent years. Additionally, new apparel known in the prior art do not teach a moisture transfer system based upon specific combinations of layers as taught in the present invention.

SUMMARY OF THE INVENTION

The present inventor has recognized the deficiencies in the apparel known in the prior art and has designed new apparel that is capable overcoming those deficiencies. More specifically, the present invention discloses a carefully selected combination of layers of specific materials that enable moisture transfer, while at the same time providing comfort to the individual wearing the apparel.

An object of the present invention is to provide apparel that can quickly transfer moisture away from an individuals body so that the individual can feel more comfortable.

Another object of the present invention is to provide individuals involved in activities such as in-line skating, snowboarding, hiking, etc., with active wear that is more functional and can better deal with the additional moisture that is generated by such individuals while involved in such activities.

Yet another object of the present invention is to provide a combination of foam-like materials and fabrics-like materials resulting from the latest technological advances in a manner unknown in the prior art.

These and other objects, features, and advantages of the present invention will become more apparent in view of the following detailed description of the preferred embodiments in conjunction with the drawings.

DETAILED DESCRIPTION OF THE PREFFERED EMBODIMENTS

A detailed description of the preferred embodiments will now be described in conjunction with the Figures. It should be understood that these embodiments are set forth for purposes of explanation only and are not to be interpreted as the only application the present invention.

The apparel illustrated in FIGS. 2–6 include shirts and jackets. Although not specifically illustrated, all other types of apparel can be manufactured according to the present invention. The application of this invention to other types of apparel could be easily accomplished by one with ordinary skill in the art.

Figure 1:
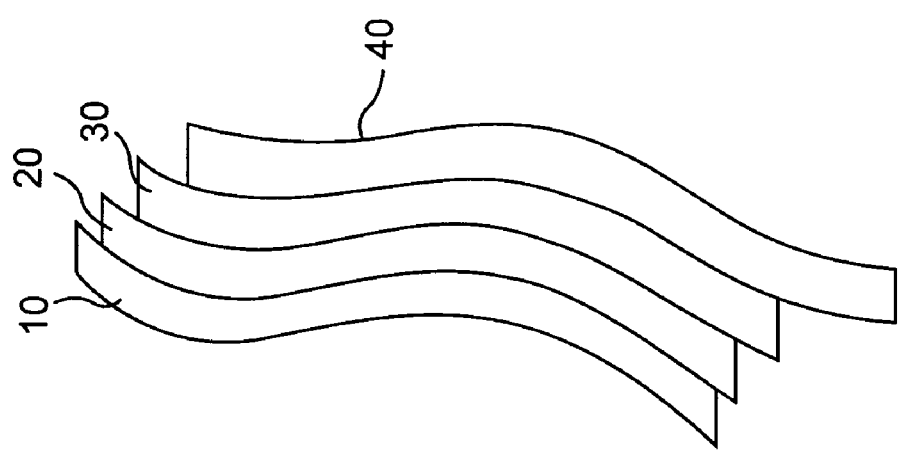
FIG. 1 generally illustrates the layers forming the combination according to an embodiment of the present invention.
Figure 2:
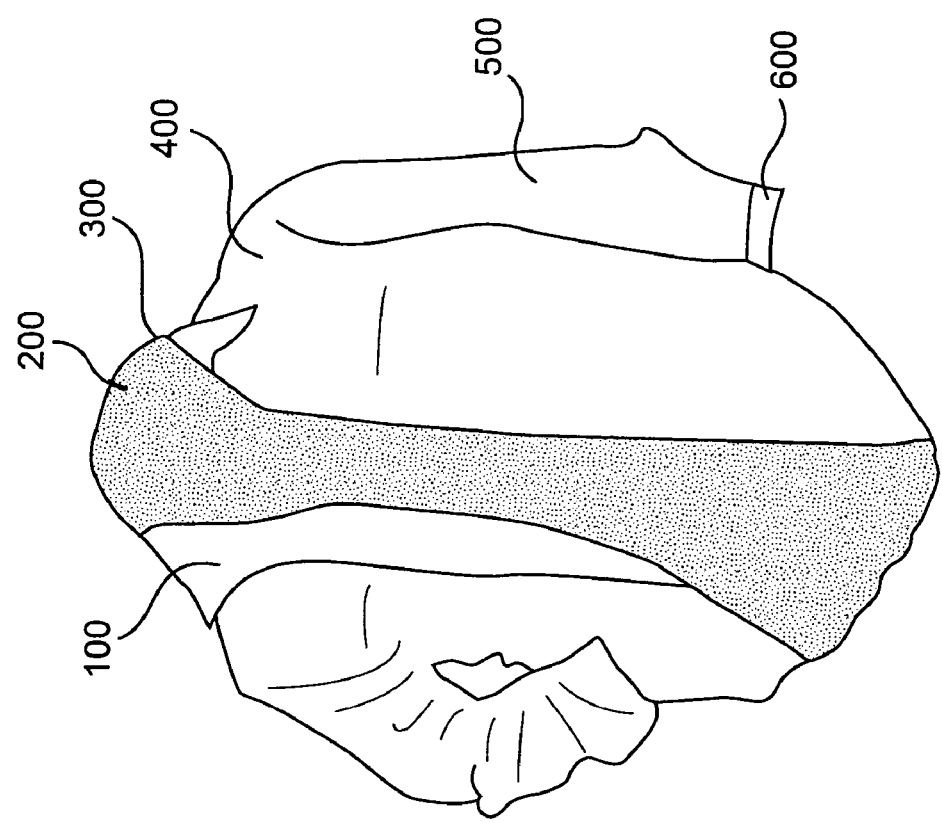
FIGS. 2–6 illustrate various applications of the different combinations of materials utilized according to the present invention.
Figure 3:
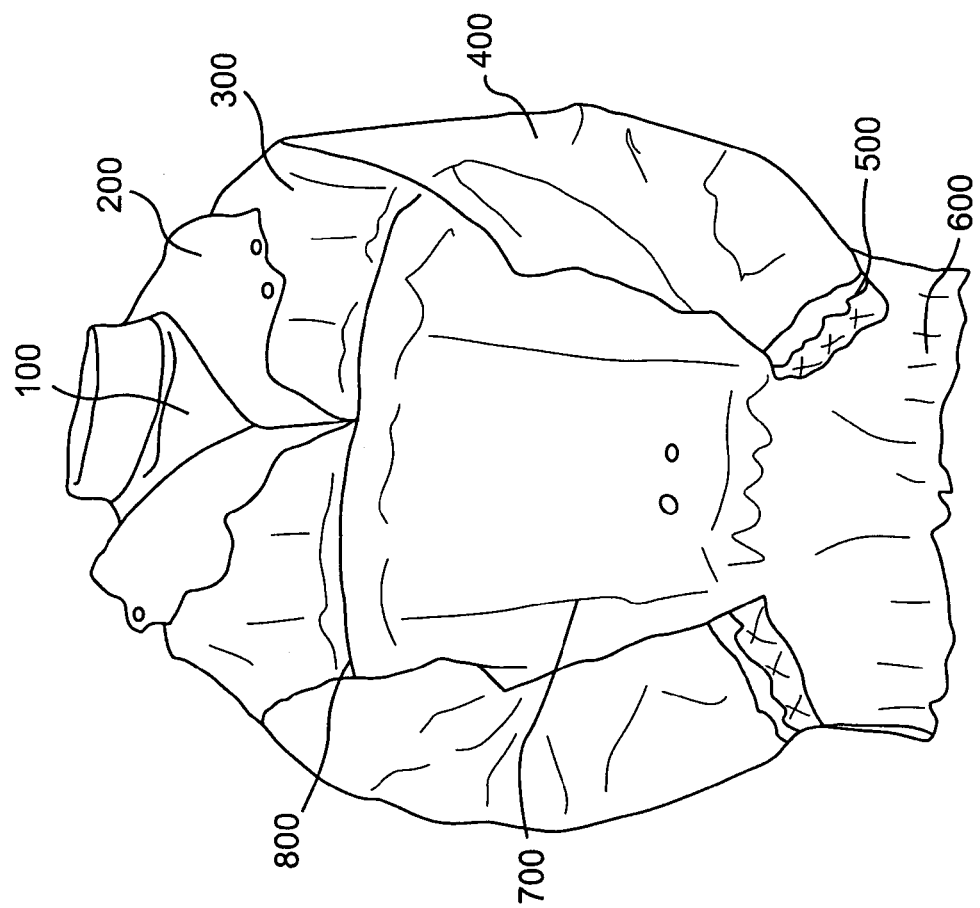
Figure 4:
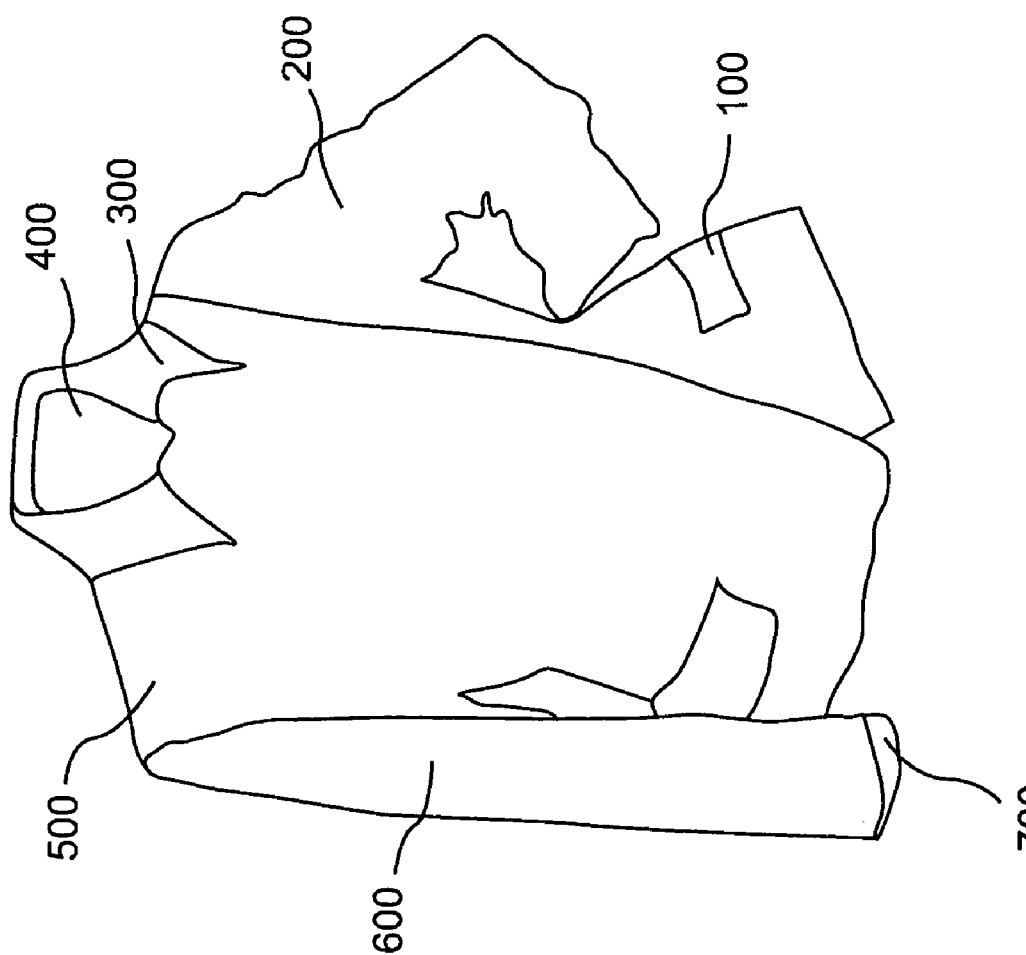
Figure 5:
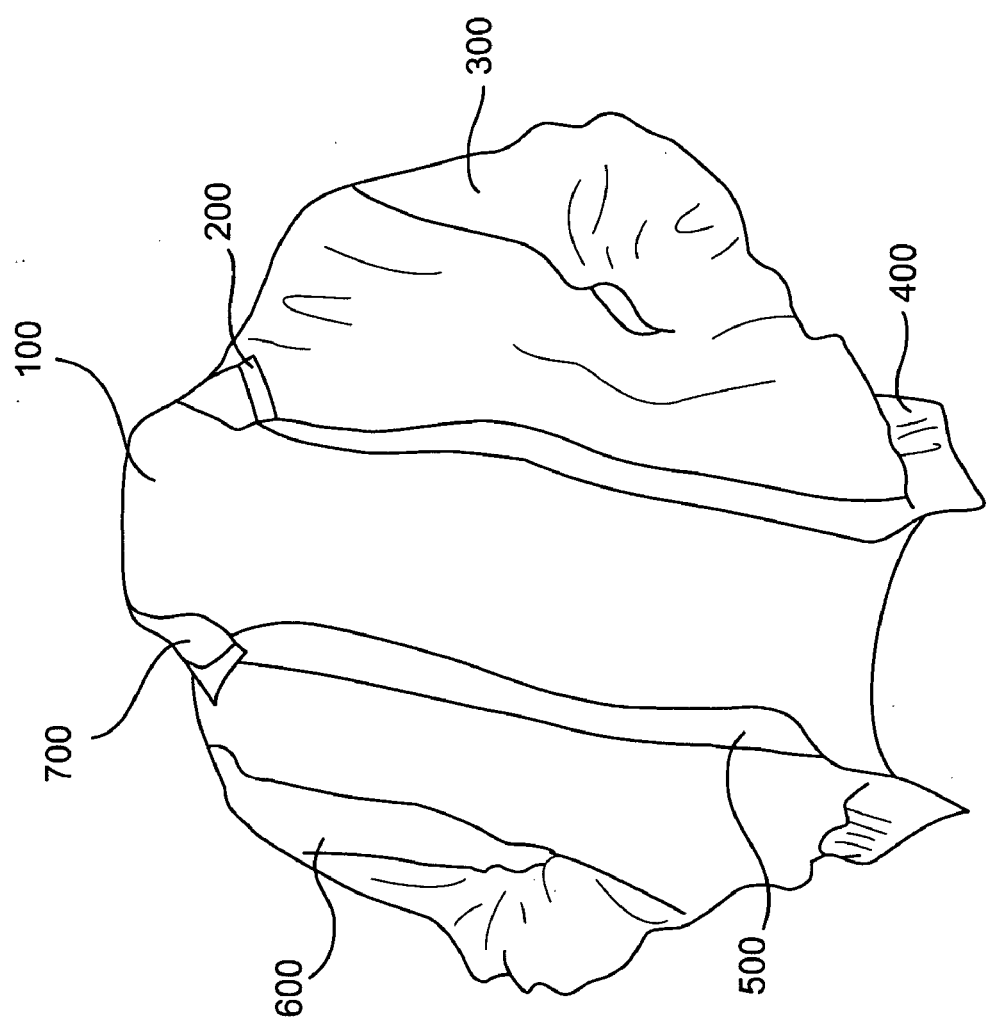
Figure 6:
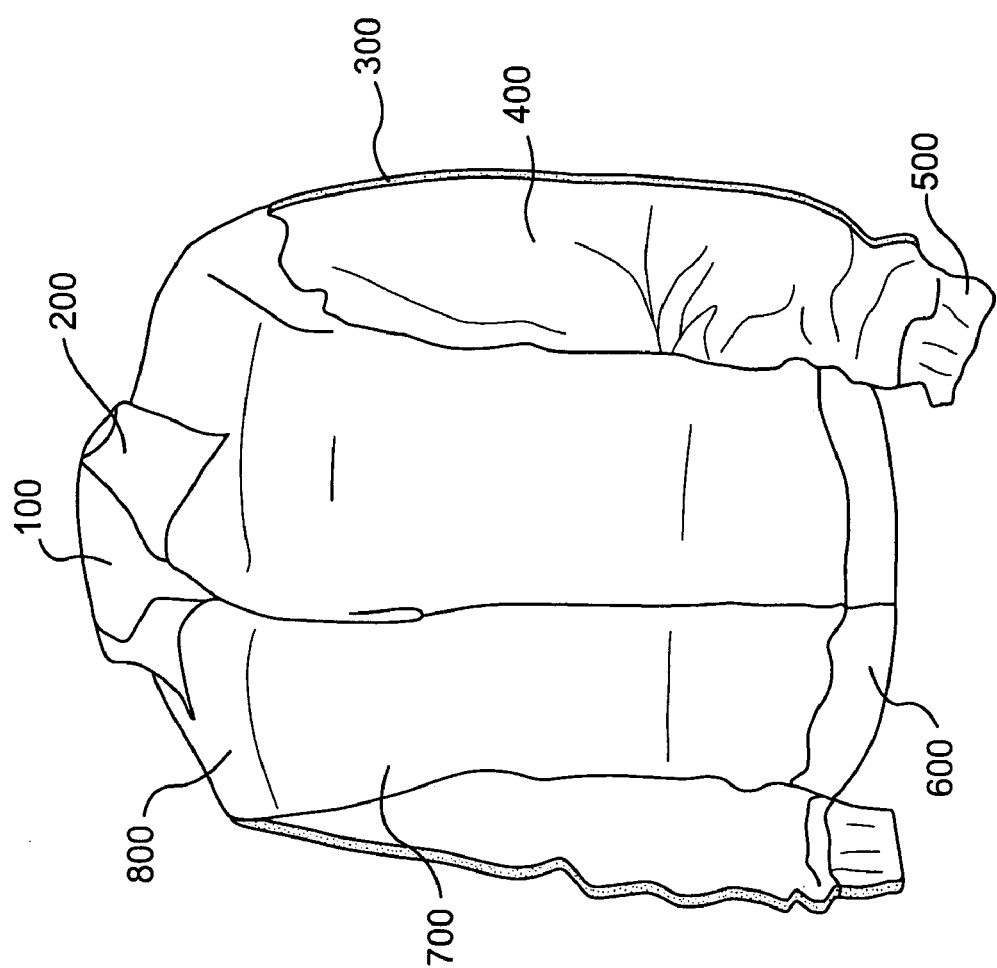

FIG. 1 generally illustrates the three layers that are a result of a preferred embodiment of the present invention, namely a first (inner) layer 10, a second layer 20, a third layer 30 and a fourth (outer) layer 40. These layers are attached to each other either by mechanical bonding (or stitch bonding, such as that performed by Tietex, Inc. or Xymid group of DuPont®), lamination (flame lamination, for example), or a combination of these two. Mechanical bonding can be performed using nylon or LYCRA® thread or the like. Other equivalent methods may also be employed. Furthermore, as mentioned later, if encapsulation technology is used for the material(s) used as the fourth layer 40, then the fourth layer 40 is preferably not laminated to the third layer 30. This is due to the nature of encapsulated materials. A detailed discussion of the materials preferably used in these layers follows.

The first layer 10 is the layer that is closest to an individuals body. First layer 10 is preferably selected from the following list of inner moisture transfer materials:

Anti-fungal, anti-microbial polypropylene and LYCRA® blend (INNOVA);

Anti-fungal, anti-microbial polypropylene blend military fleece by Deercreek Fabrics;

Anti-fungal, anti-microbial polypropylene cotton blend (ALPHA);

INTERA-Moisture Transfer Fabrics (by Argmont), which include polyester, or blends including polyester, nylon, wool cotton, etc.;

Field sensor polyester blend knitted fabric Toray AF 123PD;

Looped polyester terry or polypropylene blend;

Aqua dry treated fabric blends of polyester (distributed by Teijin Shojin;

Spun polyester or LYCRA® or cotton blend with a wicking finish or the like (distributed by Teijin Shojin);

COOL MAX fabrics; or

LYCRA®/polyester blends or the like. The first layer 10 abuts a second layer 20 and is attached thereto by lamination, mechanical bonding, ultra sonic bonding or the like. The second layer 20, in addition to its moisture transfer characteristics, provides some structural support for the apparel and can either be made of a single material or a combination of materials as set forth below.

Second layer 20 may be a reticulated, open cell or reticulated open cell hydrofilic foam with a non-woven top sheet, made by DuPont®, or the like. All the foam materials discussed herein can be AQUAZONE, made by Foamex, or the like. The non-woven top sheet may vary in composition. The preferred composition for the top sheet is wood pulp, cotton, rayon, polypropylene, LYCRA® (or a combination of two or more of these). The top sheet is usually provided on one side of the foam, but can be provided on both sides of the foam, such as in extreme performance apparel for example. The foam can be of any thickness, preferably between 1/16" and 3/16". The top sheet may also be eliminated in some performance apparel.

If desired, an Outlast membrane may be laminated between first layer 10 and second layer 20 or Frisby Technology may be embedded into the second layer 20. The Outlast membrane by Gateway Technologies may be laminated to the foam or the Frisby Technology may be embedded in the AQUAZONE, or the like. Both Gateway Technology and Frisby Technology are microencapsulated technology which depending on the application can provide either warmth or cooling. If Frisby Technologies is selected, hydrophilic foam is used in the layer 20, and is referred to as COMFORTEMP. This invention employs AQUAZONE which may or may not be embedded with the Frisby Technology, but COMFORTEMP or a hydrophilic/open cell foam may also be used and may be laminated to the Outlast membrane.

A number of patents have been issued to Triangle Research & Development Corp. disclosing details related to the processes now being employed by Gateway Technologies and Frisby. For example, U.S. Pat. Nos. 4,756,958 and 5,366,801 are directed to fibers and fabrics with reversible enhanced thermal properties, respectively. The disclosures of these two patents are hereby incorporated by reference. Other patents assigned to Triangle Research & Development Corp., that are related by subject matter and have overlapping inventorship, include U.S. Pat. Nos. 5,415,222, 5,290,904 and 5,244,356. These patents are also hereby incorporated by reference.

The combination of the foam and top sheet forming second layer 20 can be produced in at least two different ways. According to one way, second layer 20 is produced by laminating a top sheet to the foam. According to another way, the second layer 20 is a cellular elastomeric composite in which the nonwoven material of the top sheet and the foam have already been combined. In some applications, layer 20 can be omitted.

The third layer 30 abuts the non-woven top sheet of the second layer 20. The third layer 30 includes a breathable membrane, such as preferably TX1540 by Shawmut Mills, WITCOFLEX SUPER DRY film by Baxenden Chemicals (a water based hydrophilic polyurethane membrane) or the like. The waterproof/breathable membranes may be combined with Outlast Technology or may be next to the Frisby Technology embedded into the AQUAZONE or the like. The breathable/membrane absorbs the outgoing moisture and transfers it to the garment surface while providing a waterproof barrier for the garment. The membrane is laminated to the inner side of the outer fabric. If the outer fabric is encapsulated or structurally woven to repel water the breathable membrane is not necessary. For colder conditions, such as for temperatures below 32° F., an additional insulating layer may also provided along with the Outlast membrane or Frisby Technologies. This insulating layer is preferably THERMOLITE thin or EXTREME (manufactured by DuPont®) or a hydrofilic foam. Frisby Technology can be used in conjunction with the foam materials and especially in conjunction with THERMOLITE. Alternatively, this layer, like others, can be omitted entirely in certain applications.

The fourth, or outer, layer 40 abuts either the breathable membrane or the insulating material, if used, of the third layer 30. If the outer layer is a material that is encapsulated or if it is a performance fabric such as DERMIZAX by Toray or MICROFT, which is distributed by Teijin Limited, then the third layer 30 abuts the fourth layer 40, but is not laminated thereto. The following is a list of outer moisture transfer materials that could be used as the outer layer 40:

Cotton polyester blend with a breathable membrane (several choices);

Cotton blend encapsulated;

Cotton denim or chino encapsulated or waterproof breathable membrane;

2/3 ply supplex encapsulated or waterproof breathable membrane;

6-ply TASLAN encapsulated or waterproof breathable membrane;

TUDOR by Travis encapsulated or waterproof breathable membrane;

MOJAVE/TWISTER by Travis encapsulated or waterproof breathable;

Codura® encapsulated or waterproof breathable membrane;

KEVLARS by Schoeller encapsulated or membrane;

MICRO-TECHNICAL II SANDED or MICRO-TECHNICAL III SANDED by Brookwood encapsulated or breathable membrane;

CITATION SANDED or JET-LAUND by Brookwood encapsulated or breathable membrane;

Encapsulated supplex by Toray;

DERMIZAX Fabrics by Toray;

ENTRANT GIL by Toray;

MICROFTSUPER-MICROFT distributed by Teijin Shojin or ASF;

GYMSTAR PLUSGYMSTAR PLUS by Unitika;

TUFLEX-HR by Unitika;

Schoeller DRYSKIN;

Schoeller DYNAMIC EXTREME;

Schoeller KEPROTEC;

Schoeller DYNATEC;

Schoeller KEPROTECT with INOX;

Micro-polyester fabrics distributed by Teijin Shojin;

Structurally knitted acrylic, wool, with or without encapsulation (made by Toray), distributed by Teijin Shojin or ASF Group, Kyodo Sangyo Co. Ltd. (a structurally knitted fabric that repels water);

Vinyl materials with a nonwoven backing and plastics fabrics, by Tessile Florentina, Baikfan or Teijin Shojin, these groups include ERREBI, 101659-01669-01676-1271, 57006-800 and 43005-870;

STOMATEX, which is a neoprene type of material that is breathable;

DARLEXX, which is a LYCRA® type of material and is to be used in the underarm portions of certain apparel Ripstop Hardline fabric; and Wool and wool blends which include one or more of the following: acrylic, LYCRA®, polyester and nylon. These fabrics are made of yarns and are hydrophobic. Wool and wool blends are provided by Euromotte, Inc. of Belgium and/or toray in Japan. These fabrics are either pure wool, wool blends or acrylics that are knitted with hydrophilic yarns so as to be waterproof. This is in effect an encapsulation process.

All of the above, used as the fourth layer 40, are laminated with a breathable membrane, encapsulated, covered by a waterproof film or are woven man-made fabrics structurally knitted or woven to repel water. The structurally woven or knitted fabrics do not require encapsulation or breathable membranes to waterproof the garment. The preferred waterproof fabrics are MICROFT by Teijin Shojin, GYMSTAR PLUS and TUFLEX-HR both by Unitika, Ltd. Another preferable fabric is a structurally knitted acrylic or acrylic blends, which may be encapsulated and distributed by ASF and made by Toray, for example. A number of marketed waterproof exterior films could be added as an option for snowboard apparel, especially for areas covering an individuals knees, elbows and buttress area. These films (DWRs) are applied by fabric manufacturers themselves. This film may or may not be used with encapsulation but may be used in combination with the waterproof/breathable membrane systems. High abrasive materials, preferably KEVLAR fabrics by Schoellar may also be added along areas of pants, elbows, pocket lines, cuffs and buttress areas.

All technical apparel will preferably have seams hot melted or adhesively sealed to prevent moisture from entering along stitch lines. The Extreme apparel will add zipped underarm vents to aid in moisture release and will contain a hydrophilic open cell foam collar band and wrist band cover by inner fabric selection to absorb excess moisture and transport it away from an individual. A rain gut along the front shirt zipper line may be added to aid in moisture transfer.

FIGS. 2–6 illustrate various applications of the present invention as contemplated by the inventor. These applications are discussed by way of example only. More specifically, FIGS. 2–6 illustrate various styles of shirts or jackets incorporating the present invention is different combinations. The reference numerals 101–109 represent various areas of the different types apparel constructed from the following combinations of materials. It is once again mentioned that Outlast can be combined with the materials listed below, although not specifically mentioned. In other words, Outlast or Frisby Technologies can be combined with the foam materials, the breathable membranes, the THERMO-LITE or any of the outer fabrics. Outlast or Frisby Technologies can also be combined with encapsulation, by Nextec, for use in the outer layer 40. Of course, Outlast or Frisby Technologies can also be used by itself.

Numeral 100 is preferably formed by a layer 40 formed from a cotton blend fabric that is encapsulated and may include denim and chino fabrics. Inside of layer 40 is a layer 20 which is a cellular elastomeric composite or a hydrophilic ⅛" foam having a non-woven top sheet. Inside of layer 20 is a layer 10 of any of the inner liner materials listed above in connection with layer 10. According to this application, layer 30 is omitted.

Numeral 200 has a layer 40 of an encapsulated cotton blend abutting THERMOLITE EXTREME, MICROLOFT or the like, or abutting a hydrophilic, open cell foam or a reticulated foam (either or in combination as a composite). Inside layer 40 is a layer 20 which is a non-woven and foam, the foam being preferably AQUAZONE. Inside layer 20 is a layer 10 which can be any of the inner liner materials mentioned above in connection with layer 10. Layer 30 is omitted.

Numeral 300 has a layer 40 that is a cotton, acrylic, polyester or a blend. Inside layer 40 is a layer 30 which is a waterproof breathable membrane. Inside layer 30 is a layer 10 which is one of various inner liner materials. Layer 20 is omitted.

Numeral 400 has a layer 40 that is a cotton/acrylic/polyester blend. Inside layer 40 is layer 30 which is a waterproof breathable membrane. Inside layer 30 is a layer 20 which is either THERMOLITE or reticulated/open cell hydrofilic foam with or without Frisby Technology. If foam is used, AQUAZONE is preferred. Also, the THERMOLITE and foam may be combined. Inside layer 20 is layer 10 of one of the inner liner materials.

Numeral 500 has a layer 40 of 2/4 Supplex, 6-ply TASLAN, Cordura, Micro-Technical II and III, CITATION SANDED, TUDOR, MOJAVE, TWISTER Travis fabrics, KEVLAR fabrics, laminated breathable membrane or encapsulated outer fabrics. Inside layer 40 is a layer 30 of THERMOLITE. Instead of THERMOLITE, a reticulated/open cell hydrophilic foam may be used, or may be combined with the THERMOLITE. Inside layer 30 is a layer 20 of a cellular elastomeric composite. Inside layer 20 is a layer 10 of one of the inner liner materials.

Numeral 600 has a layer 40 of GYMSTAR PLUS or SUPER-MICROFT structural constructed water-repellent fabrics. Inside layer 40 is a layer 20 of a non-woven and foam composite with or without a breathable membrane 30 between layers 40 and 20. Inside layer 20 is a layer 10 of one of the inner liner materials.

Numeral 700 has a layer 40 of GYMSTAR PLUS, SUPER-MICROFT, TUFLEX-HR, abutting THERMO-LITE EXTREME or hydrofilic foam or a combination of these. Inside this layer 40 is a layer 20 which is a cellular elastomeric composite or a foam with a non-woven top sheet laminated thereto. A breathable membrane 30 can optionally be added between layers 20 and 40.

Numeral 800 has a layer 40 made of one of the possible fabrics mentioned above, except GYMSTAR PLUS or SUPER-MICROFT waterproof breathable membrane. Inside layer 40 is a layer 20 which is a cellular elastomeric composite. Inside layer 20 is a layer 10 of one of the inner liner materials.

Numeral 900 has a layer 40 made of one of the possible fabrics mentioned above, except GYMSTAR PLUS or SUPER-MICROFT waterproof breathable membrane. Inside layer 40 is a layer 30 of Themolite or a layer 20 of reticulated or hydrophilic open cell foam with a nonwoven top sheet. Inside layer 30 or layer 20 is a layer 10 of one of the inner liner materials.

The examples presented above illustrate how various combinations of the present invention can be realized is different parts of different types of apparel. Other variations are also possible given the range of combinations that are possible.

The microfiber technology disclosed above is rapidly developing and changing and has greatly increased the potential for improved performance of such products such as performance apparel, provided that they are properly utilized as in the present invention. These new products are part of rapidly developing fabric technology. The present invention employs a combination of fabrics, foam layers, non-wovens, spacer fabrics, breathable membranes, encapsulated technology, structural woven water repellent fabrics, or waterproof film coatings in such combinations that increase the performance of the products in which they are used as well as increase breathability. The waterproof/breathable membranes have also only recently developed and are believed to be less than ten years old.

While the present invention has been described above in connection with the preferred embodiments, one of ordinary skill in the art would be enabled by this disclosure to make various modifications to these embodiments and still be within the scope and spirit of the present invention as embodied in the appended claims.

What is claimed is:

1. A moisture transfer apparel to be worn by individuals engaged in activities that generate moisture comprising, on at least a portion of the apparel, a combination of layers comprising:

a first layer, closest to the individual, the first layer being an inner moisture transfer material;

a second layer, abutting the first layer, including a breathable, open cell foam material;
a third layer, abutting the second layer, including a knit material; and
a fourth layer, abutting the third layer, the fourth layer being an outer moisture transfer material that is encapsulated for waterproofing,
wherein the combination of layers is breathable and enables moisture vapor to be transferred through the apparel from the first layer through the fourth layer so as to keep the individuals dry,
wherein at least one of the first through fourth layers has reversible enhanced thermal properties.

2. The moisture transfer apparel according to claim 1, wherein at least two of the first, second, third and fourth layers are attached to each other by lamination.

3. The moisture transfer apparel according to claim 1, wherein at least two of the first, second, third and fourth layers are attached to each other by mechanical bonding.

4. The moisture transfer apparel according to claim 1, wherein the fourth layer is laminated to the knit of the third layer.

5. A moisture transfer apparel to be worn by individuals engaged in activities that generate moisture comprising, on at least a portion of the apparel, a combination of layers comprising:
a first layer, closest to the individual, the first layer being an inner moisture transfer material;
a second layer, abutting the first layer, including a breathable, open cell foam material;
a third layer, abutting the second layer, including a knit material; and
a fourth layer, abutting the third layer, the fourth layer being an outer moisture transfer material that is selected from fabrics that are structurally knitted or woven to repel water,
wherein the combination of layers is breathable and enables moisture vapor to be transferred through the apparel from the first layer through the fourth layer so as to keep the individuals dry,
wherein at least one of the first through fourth layers has reversible enhanced thermal properties.

6. The moisture transfer apparel according to claim 1, wherein the second layer and third layer are formed as an elastomeric composite having the knit material combined with the breathable, open cell foam material in a single process.

7. A moisture transfer apparel to be worn by individuals engaged in activities that generate moisture comprising, on at least a portion of the apparel, a combination of layers comprising:
a first layer, closest to the individual, the first layer being an inner moisture transfer material;
a second layer, abutting the first layer, including a breathable, open cell foam material;
a third layer, abutting the second layer, including a knit material; and
a fourth layer, abutting the third layer, the fourth layer being an outer moisture transfer material that is encapsulated for waterproofing,
wherein the combination of layers is breathable and enables moisture vapor to be transferred through the apparel from the first layer through the fourth layer so as to keep the individuals dry,
wherein the second layer is treated with microencapsulation technology which can adjust to temperature changes.

8. A moisture transfer apparel to be worn by individuals engaged in activities that generate moisture comprising, on at least a portion of the apparel, a combination of layers comprising:
a first layer, closest to the individual, the first layer being an inner moisture transfer material;
a second layer, abutting the first layer, including a breathable, open cell foam material;
a third layer, abutting the second layer, including a knit material; and
a fourth layer, abutting the third layer, the fourth layer being an outer moisture transfer material that is selected from fabrics that are structurally knitted or woven to repel water,
wherein the combination of layers is breathable and enables moisture vapor to be transferred through the apparel from the first layer through the fourth layer so as to keep the individuals dry,
wherein the second layer is treated with microencapsulation technology which can adjust to temperature changes.

9. The moisture transfer apparel according to claim 1, wherein the second layer has reversible enhanced thermal properties.

10. The moisture transfer apparel according to claim 5, wherein the second layer has reversible enhanced thermal properties.

11. The moisture transfer apparel according to claim 1, wherein the outer moisture transfer material is selected from a group consisting of cotton and a cotton blend.

12. The moisture transfer apparel according to claim 1, wherein the outer moisture transfer material comprises synthetic fibers.

13. The moisture transfer apparel according to claim 1, further comprising a membrane, abutting the breathable, open cell foam material, for providing either warmth or cooling.

14. The moisture transfer apparel according to claim 1, further comprising a membrane, abutting the breathable, open cell foam material, for providing either warmth or cooling.

15. The moisture transfer apparel according to claim 1, wherein a membrane is applied to the second layer so that it has reversible thermal enhanced properties.

16. The moisture transfer apparel according to claim 5, wherein a membrane is applied to the second layer so that it has reversible thermal enhanced properties.

17. A moisture transfer apparel according to claim 1, wherein the second layer includes a breathable membrane.

18. A moisture transfer apparel according to claim 1, wherein the third layer includes a breathable membrane.

19. A moisture transfer apparel according to claim 1, wherein the second layer includes a thermal insulating material.

20. A moisture transfer apparel according to claim 1, wherein the third layer includes a thermal insulating material.

21. A moisture transfer composite comprising a plurality of layers arranged to transfer moisture in a predetermined direction, the moisture transfer composite comprising:
an inner fabric layer;
an outer fabric layer positioned relative to the inner fabric layer in the direction of moisture flow, wherein moisture flows from the inner fabric layer through any intermediate layers and then through the outer fabric layer; and at least one breathable, open cell foam material positioned between the inner fabric layer and the outer fabric layer, wherein the outer fabric layer is made to have waterproof/breathable characteristics and wherein the breathable, open cell foam material is an open-cell breathable, open cell foam that is positioned adjacent to a knit material and wherein microencapsulation technology which can adjust to temperature changes is applied to either the breathable, open cell foam material or knit material thereby giving either material reversible enhanced thermal properties.

22. The moisture transfer composite according to claim 21, wherein a wetting agent is applied to the inner fabric layer in order to increase moisture transfer.

23. The moisture transfer composite according to claim 21, wherein the outer fabric layer is made to have waterproof/breathable characteristics by attaching a waterproof/breathable membrane thereto.

24. The moisture transfer composite according to claim 21, wherein the outer fabric layer is made to have waterproof/breathable characteristics by application of a waterproof film.

25. The moisture transfer composite according to claim 21, wherein the breathable, open cell foam material has reversible enhanced thermal properties.

26. A moisture transfer composite comprising a plurality of layers arranged to transfer moisture in a predetermined direction, the moisture transfer composite comprising:
an inner fabric layer;
an outer fabric layer positioned relative to the inner fabric layer in the direction of moisture flow, wherein moisture flows from the inner fabric layer through any intermediate layers and then through the outer fabric layer; and
at least one breathable, open cell foam material positioned between the inner fabric layer and the outer fabric layer, wherein the breathable, open cell foam material is an antimicrobial, germicidal, open-cell breathable, open cell foam that is positioned adjacent to a knit material, and wherein the outer fabric layer has waterproof/breathable characteristics; and wherein microencapsulation technology which can adjust to temperature changes is applied to either the breathable, open cell foam material or knit material thereby giving either material reversible enhanced thermal properties.

27. The moisture transfer composite according to claim 26, wherein a wetting agent is applied to the inner fabric layer in order to increase moisture transfer.

28. The moisture transfer composite according to claim 26, wherein the outer fabric layer is made to have waterproof/breathable characteristics by attaching a waterproof/breathable membrane thereto.

29. The moisture transfer composite according to claim 26, wherein the outer fabric layer is made to have waterproof/breathable characteristics by either the application of a waterproof film or by the application of a waterproof coating.

30. A moisture transfer composite which transfers moisture through a plurality of layers comprising:
an inner moisture transfer layer;
a breathable, open cell foam material positioned adjacent to the inner moisture transfer layer; and
a knit material positioned adjacent to the breathable, open cell foam layer,
wherein moisture is transferred from the inner moisture transfer layer, through the breathable, open cell foam layer and subsequently through the knit material and wherein microencapsulation technology which can adjust to temperature changes is applied to either the breathable, open cell foam material or knit material thereby giving either material reversible enhanced thermal properties.

31. The moisture transfer composite according to claim 30, wherein the breathable, open cell foam material has reversible enhanced thermal properties.

32. The moisture transfer composite according to claim 30, wherein the breathable, open cell foam material is a breathable, open cell foam material.

33. The moisture transfer composite according to claim 21, wherein the inner fabric layer includes at least polyester or a polyester blend.

34. The moisture transfer composite according to claim 26, wherein the inner fabric layer includes at least polyester or a polyester blend.

35. The moisture transfer composite according to claim 21, wherein said knit material includes at least one material selected from a group consisting of spandex, wood pulp, cotton, polypropylene, polyester and rayon.

36. The moisture transfer composite according to claim 25, wherein said knit material includes at least one material selected from a group consisting of spandex, wood pulp, cotton, polypropylene, polyester and rayon.

37. The moisture transfer composite according to claim 26, wherein said knit material includes at least one material selected from a group consisting of spandex, wood pulp, cotton, polypropylene, polyester and rayon.

38. The moisture transfer composite according to claim 30, wherein said knit top material includes at least one material selected from a group consisting of spandex, wood pulp, cotton, polypropylene, polyester and rayon.

39. The moisture transfer composite according to claim 31, wherein said knit material includes at least one material selected from a group consisting of spandex, wood pulp, cotton, polypropylene, polyester and rayon.

40. The moisture transfer composite according to claim 30, wherein the inner moisture transfer layer includes at least polyester or a polyester blend.

41. The moisture transfer composite according to claim 21, wherein the microencapsulation technology is applied by using a membrane.

42. The moisture transfer composite according to claim 26, wherein microencapsulation technology is applied by using a membrane.

43. The moisture transfer composite according to claim 30, wherein microencapsulation technology is applied by using a membrane.

44. The moisture transfer composite according to claim 21, wherein the breathable, open cell foam material and knit material are formed in a single process as an elastomeric composite.

45. The moisture transfer composite according to claim 26, wherein the breathable, open cell foam material and knit material are formed in a single process as an elastomeric composite.

46. The moisture transfer composite according to claim 30, wherein the breathable, open cell foam material and knit material are formed in a single process as an elastomeric composite.

47. The moisture transfer composite according to claim 21, wherein the application of microencapsulation technology includes application of microcapsules containing phase change materials (PCMs).

48. The moisture transfer composite according to claim 26, wherein the application of microencapsulation technology includes application of microcapsules containing phase change materials (PCMs).

49. The moisture transfer composite according to claim 30, wherein the application of microencapsulation technology includes application of microcapsules containing phase change materials (PCMs).

50. The moisture transfer composite according to claim 47, wherein the microcapsules containing PCMs are applied to the breathable, open cell foam material or the knit material as a coating.

51. The moisture transfer composite according to claim 48, wherein the microcapsules containing PCMs are applied to the breathable, open cell foam material or the knit material as a coating.

52. The moisture transfer composite according to claim 49, wherein the microcapsules containing PCMs are applied to the breathable, open cell foam material or the knit material as a coating.

53. The moisture transfer composite according to claim 47, wherein the microcapsules containing PCMs are applied so as to be integrally present in the breathable, open cell foam material or the knit material.

54. The moisture transfer composite according to claim 48, wherein the microcapsules containing PCMs are applied so as to be integrally present in the breathable, open cell foam material or the knit material.

55. The moisture transfer composite according to claim 49, wherein the microcapsules containing PCMs are applied so as to be integrally present in the breathable, open cell foam material or the knit material.

56. The moisture transfer composite according to claim 46, wherein the elastomeric composite has microencapsulation technology applied thereto by application of microcapsules containing phase change materials (PCMs).

57. The moisture transfer composite according to claim 56, wherein the microcapsules containing PCMs are applied to the elastomeric composite as a coating.

58. The moisture transfer composite according to claim 56, wherein the microcapsules containing PCMs are applied so as to be integrally present in the elastomeric composite.

59. The moisture transfer composite according to claim 46, wherein the elastomeric composite has microencapsulation technology applied thereto by application of a membrane.

60. The moisture transfer composite according to claim 21, wherein the outer fabric layer is made to have waterproof/breathable characteristics by employing encapsulation technology.

61. The moisture transfer composite according to claim 21, wherein the outer fabric layer is made to have waterproof/breathable characteristics by employing encapsulation technology.

* * * * *

UNITED STATES PATENT AND TRADEMARK OFFICE
CERTIFICATE OF CORRECTION

PATENT NO. : 7,147,911 B2 Page 1 of 1
APPLICATION NO. : 10/777159
DATED : December 12, 2006
INVENTOR(S) : Baychar It is certified that error appears in the above-identified patent and that said Letters Patent is hereby corrected as shown below:

ON THE TITLE PAGE

Correct (75) Inventor to read as follows:

(75) Baychar, Carrbassett, ME (US)

Correct (73) Assignee to read as follows:

(73) ~~Solida~~ Solid Water Holdings

Signed and Sealed this

Twenty-seventh Day of February, 2007

JON W. DUDAS
*Director of the United States Patent and Trademark Office*